US008381566B2

(12) United States Patent
Givens et al.

(10) Patent No.: US 8,381,566 B2
(45) Date of Patent: Feb. 26, 2013

(54) PASSIVE-ACTIVE END-EFFECTOR AND PNEUMATIC MANIPULATOR EQUIPPED THEREWITH

(75) Inventors: Raymond David Givens, Ilderton (CA); Christopher William Garland, Dorchester (CA); David Chivers, London (CA)

(73) Assignee: Givens Engineering Inc., London (CA)

( * ) Notice: Subject to any disclaimer, the term of this patent is extended or adjusted under 35 U.S.C. 154(b) by 1366 days.

(21) Appl. No.: 12/023,033

(22) Filed: Jan. 31, 2008

(65) Prior Publication Data

US 2008/0187421 A1      Aug. 7, 2008

Related U.S. Application Data

(60) Provisional application No. 60/888,069, filed on Feb. 2, 2007.

(51) Int. Cl.
*B21J 13/10* (2006.01)
(52) U.S. Cl. ........................................... 72/420; 414/735
(58) Field of Classification Search .................... 72/361, 72/422, 420; 414/618, 735; 248/592, 593, 248/595; 901/30, 31
See application file for complete search history.

(56) References Cited

U.S. PATENT DOCUMENTS

| 3,058,602 | A | * | 10/1962 | Kilman ........................... 414/11 |
| 3,526,388 | A | | 6/1968 | Geiger et al. |
| 3,758,079 | A | | 9/1973 | Workman, Jr. et al. |
| 3,791,627 | A | | 2/1974 | Stone et al. |
| 3,880,393 | A | | 4/1975 | Watson |
| 4,500,074 | A | | 2/1985 | Fox et al. |
| 4,989,444 | A | * | 2/1991 | Murakami et al. ............... 72/422 |
| 5,224,808 | A | * | 7/1993 | Macris ........................... 414/11 |
| 5,269,644 | A | | 12/1993 | Vatel |
| 5,613,419 | A | | 3/1997 | Pierson et al. |
| 5,816,132 | A | | 10/1998 | Langner et al. |
| 2007/0180886 | A1 | * | 8/2007 | Kutschker ....................... 72/422 |

* cited by examiner

*Primary Examiner* — Debra Sullivan
(74) *Attorney, Agent, or Firm* — Brunet & Co. Ltd.; Robert A. H. Brunet

(57) ABSTRACT

Attachments for power assisted lifting devices capable of rigidly positioning an object in three-dimensional space, for example pneumatically assisted manually operated mechanical arm manipulators, wherein the attachment is capable of securing an object for remote positioning thereof. More particularly, an end effector for a pneumatic manipulator that is capable of both passively following the motion of a secured object and actively adjusting the position of the secured object in an arcuate direction relative to the attachment of the end effector to the manipulator. The end effector is able to rotate the object about an axis passing through the end effector that also moves arcuately with the end effector. The end effector is particularly useful in the bending of metallic sheets or plates using a conventional sheet metal brake, as the end effector is capable of both positioning heavy sheets in the brake and following the movement of the sheet as it is being bent. The end effector may be used in conjunction with the manipulator to remove the sheet from the brake, flip the sheet using the rotation feature, then re-position the sheet within the brake for making successive bends on the same sheet without necessitating release by the end effector.

17 Claims, 4 Drawing Sheets

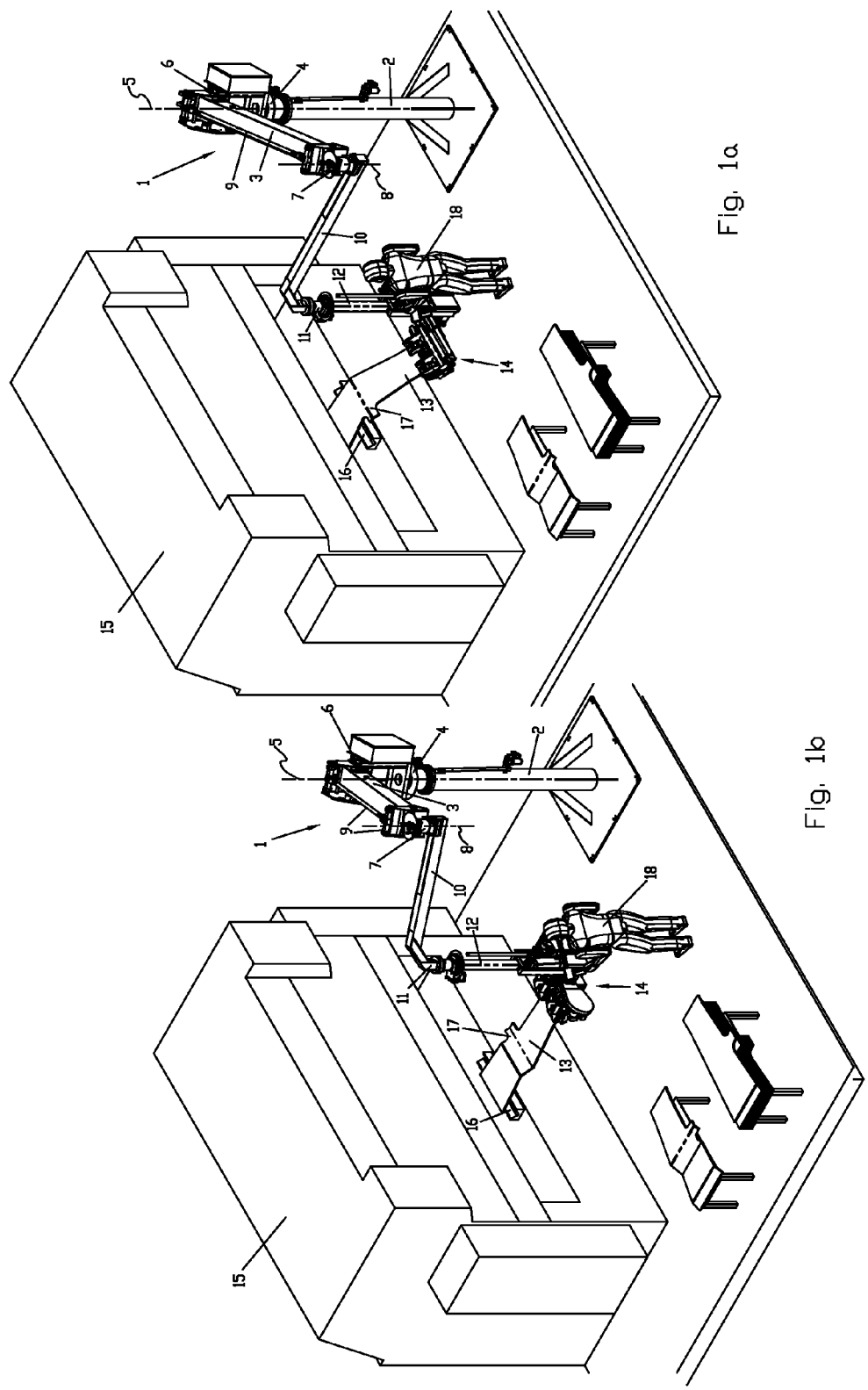

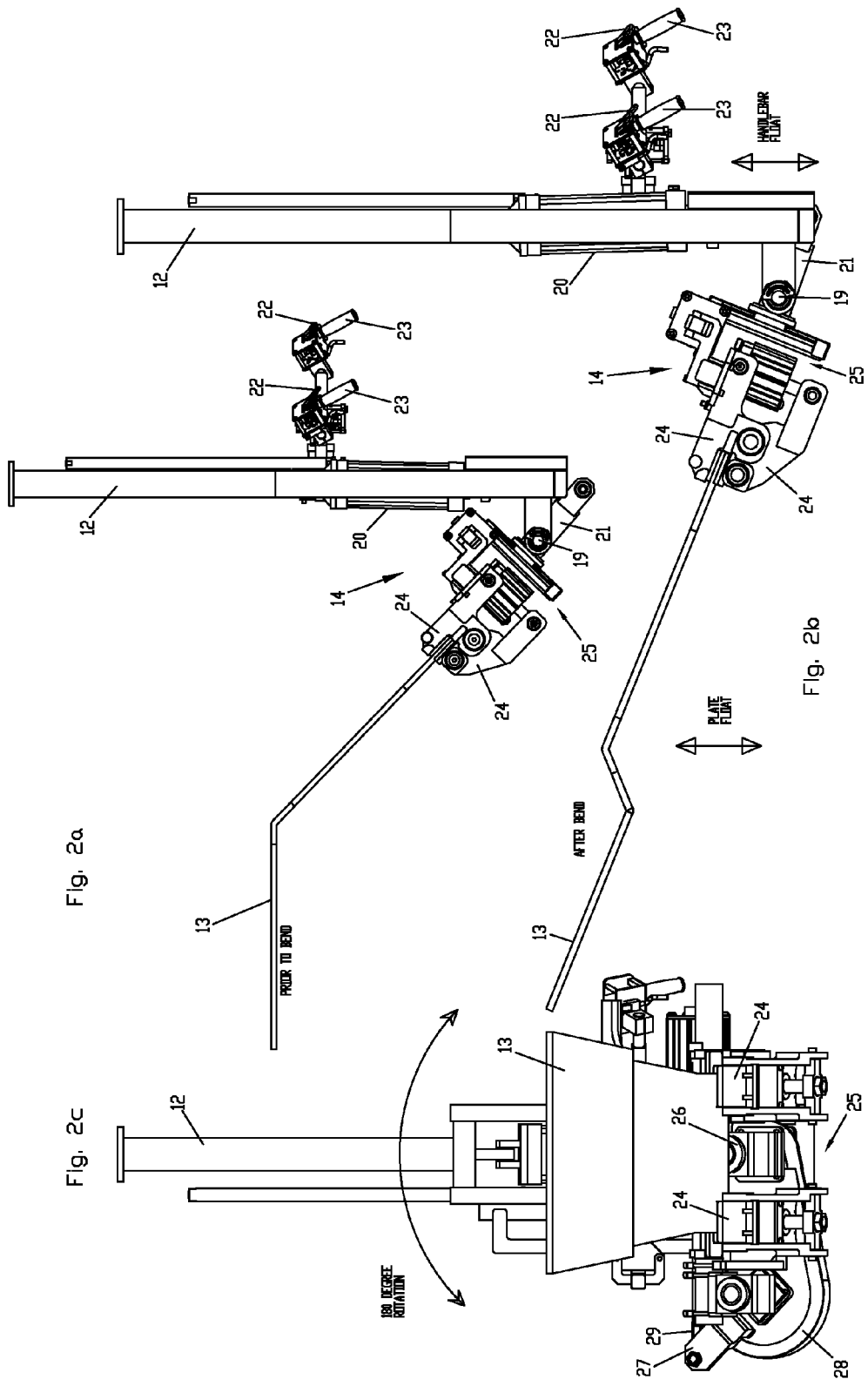

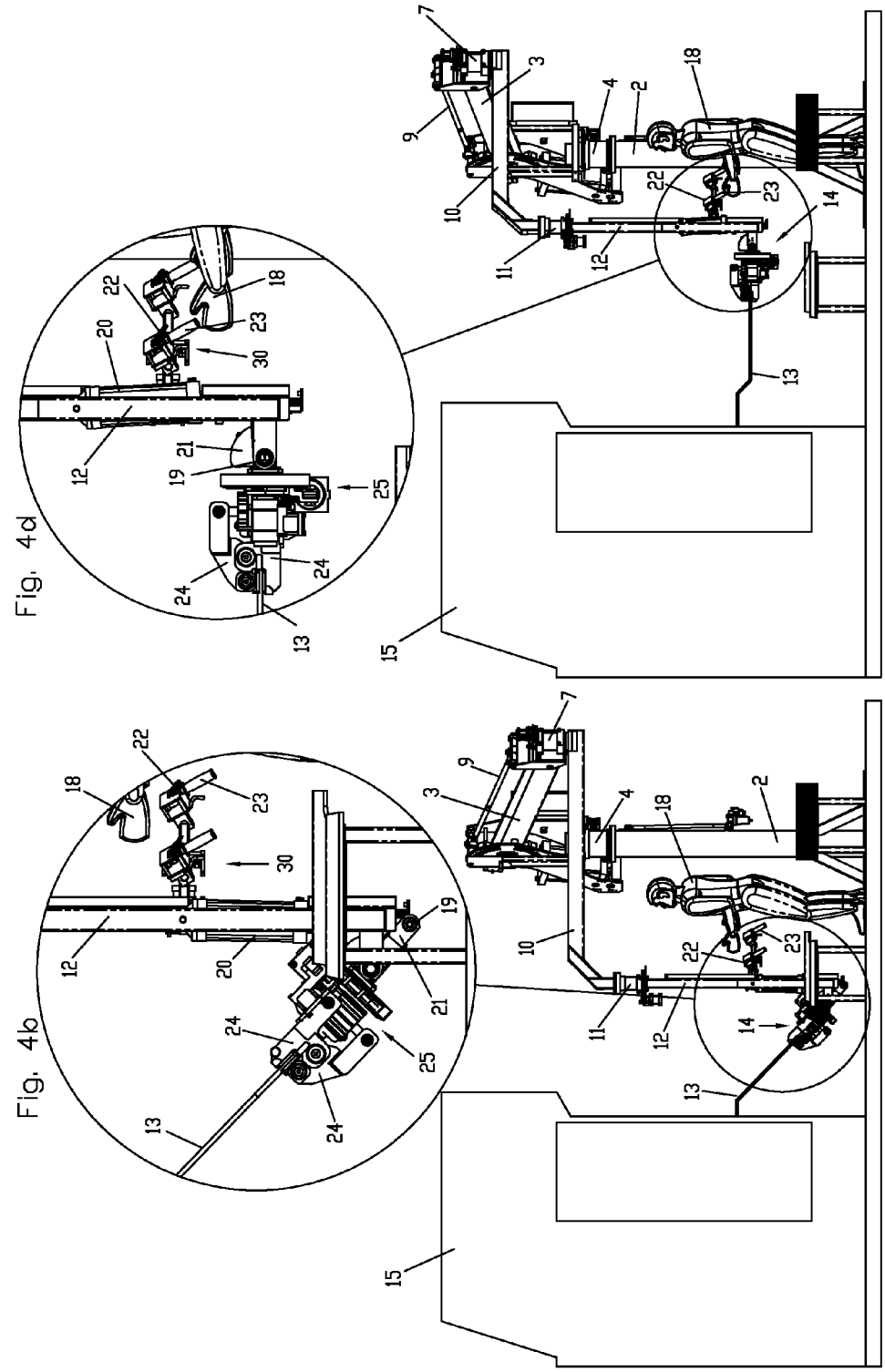

PASSIVE-ACTIVE END-EFFECTOR AND PNEUMATIC MANIPULATOR EQUIPPED THEREWITH

CROSS-REFERENCE TO RELATED APPLICATIONS

This application claims the benefit of U.S. patent application 60/888,069, filed on Feb. 2, 2007, which is incorporated herein by reference.

FIELD OF THE INVENTION

The invention relates to attachments for power assisted lifting devices capable of rigidly positioning an object in three-dimensional space, for example pneumatically assisted manually operated mechanical arm manipulators, wherein the attachment is capable of securing an object for remote positioning thereof. More particularly, the invention relates to an end effector for a pneumatic manipulator that is capable of both passively following the motion of a secured object and actively adjusting the position of the secured object in an arcuate direction relative to the attachment of the end effector to the manipulator. The end effector is particularly useful in the bending of metallic sheets or plates using a conventional sheet metal brake, as the end effector is capable of both positioning heavy sheets in the brake and following the movement of the sheet as it is being bent. Also disclosed are pneumatic manipulators including the end effector and methods of bending plates using the end effector.

BACKGROUND

Certain types of lifting devices are capable of both lifting heavy objects and rigidly positioning objects in three-dimensional space. For example, pneumatically assisted manually operated manipulators have found widespread use. These manipulators typically consist of an arm that extends outwardly in a generally horizontal direction from a mast about which it is permitted to rotate and from which it is also permitted to pivot arcuately in a generally vertical direction in a pneumatically assisted manner. The arm may include one or more extension members serially disposed from an end of the arm distal from the mast that are similarly permitted to rotate and/or pivot. This arrangement permits the positioning of the distal end of the arm or extension member at a desired location in three dimensional space. An end effector is an attachment coupled to the distal end of the arm or extension member and adapted for the manipulation of a desired object or for the conduct of a particular task. For example, an end effector may include clamping means, pincer means, magnetic means or the like that are shaped and/or sized for the securement of a desired object to be positioned. The manipulator normally includes a pneumatic cylinder adjusted to a pre-determined pressure selected so that the weight of the object is just balanced by the cylinder. In this manner, the object becomes weightless with respect to the operator, who is then able to manually position the object in three dimensional space.

When bending a sheet of steel using a conventional sheet metal brake, a portion of the sheet is placed within the brake and another portion of the sheet extends outwardly therefrom. The brake includes a hydraulically operated edge that fits within a complementary die located on the press. When the edge is engaged with the sheet to effect the bend, the outwardly extending portion of the sheet moves arcuately in response to bending of the sheet within the die. Conventionally, human operators hold the sheet during the bending operation and are required to follow the arcuate movement of the sheet with their arms, often ending with the operator's arms in an overhead position. This repetitive arm movement can lead to occupational strain injuries that are particularly exacerbated when heavy sheets are being bent. There is also a risk of limb loss or other accidental injury due to the proximity of the operators to the press and the potential for the operators to drop the sheet.

Although it would be desirable to utilize a pneumatically assisted manually operated manipulator in this application, currently no end effector exists that is capable of both positioning the sheet within the brake and following the arcuate movement of the sheet during the bending operation. Conventional passive end effectors are not capable of rotating or otherwise actively re-positioning the angular orientation of the sheet in order to permit successive bending operations to take place on the same sheet. What is needed is an end effector for a manipulator that is capable of both passively following the movement of the sheet and actively re-positioning the sheet. It would be desirable is this end effector were provided in combination with a suitable manipulator for working with heavy sheets.

Although conventional manipulators make the object being lifted essentially weightless, the manipulator itself requires a certain amount of human power to adjust its position. In order to manipulate heavy objects, the size of the manipulator increases as well as the size of the pneumatic cylinders. Operators are required to overcome both the inertia of the manipulator and to aid in the expression of air from the cylinders during re-positioning of the object. It would therefore be desirable to have a power assisted lifting feature on manipulators to selectively reduce the amount of manual effort required by the operator during re-positioning operations. It would be further desirable to include this power assisted lifting feature in conjunction with end effectors suitable for sheet bending operations.

SUMMARY OF THE INVENTION

According to the present invention, there is provided an attachment for a lifting device capable of positioning an object in three-dimensional space, the attachment comprising: a selectively engageable securement means for selectively securing the object to the attachment and selectively releasing the object from the attachment; a pivot for permitting arcuate movement of the attachment relative to the lifting device; a resilient biasing means for providing a biasing force sufficient to offset the weight of the object, the biasing means permitting externally induced movement of the attachment means about the pivot; and, an adjustment means for selectively providing an adjustment force for changing an angular orientation of the attachment relative to the pivot.

According to another aspect of the present invention, there is provided a pneumatically assisted manually operated manipulator comprising: a rotatable vertical extension member manually positionable in three-dimensional space; an end-effector attached to the vertical extension member comprising, a selectively engageable securement means for selectively securing the object to the attachment and selectively releasing the object from the attachment, a pivot for permitting arcuate movement of the attachment relative to the lifting device, a resilient biasing means for providing a biasing force sufficient to offset the weight of the object, the biasing means permitting externally induced movement of the attachment means about the pivot, and, an adjustment means for selectively providing an adjustment force for changing an angular orientation of the attachment relative to the pivot; an operator control center on the vertical extension member operatively interconnected with the end effector; and, at least a handle for use by an operator in manually positioning the end-effector.

According to yet another aspect of the present invention, there is provided a method of bending an object comprising a sheet of material using a press, the method comprising: providing a lifting device capable of manually positioning the object in three-dimensional space; providing an attachment on the lifting device having securement means for securing the object, the attachment able to passively move in response to externally induced movement of the object and able to actively change the angular orientation of the object; manually positioning the attachment adjacent the object and securing the object with the securement means; manually positioning the object within the press using the lifting device; bending the object using the press, thereby creating externally induced movement of the object; allowing the attachment to passively move in response to the externally induced movement; manually removing the object from the press using the lifting device; and, actively changing the angular orientation of the object using the attachment.

BRIEF DESCRIPTION OF THE DRAWINGS

Having summarized the invention, preferred embodiments thereof will now be described with reference to the accompanying figures, in which:

FIG. 1a shows a manipulator according to an embodiment of the present invention with a sheet of steel being bent into a first position by a sheet metal press;

FIG. 1b shows the manipulator of FIG. 1a with the sheet of steel being bent into a second position;

FIG. 2a shows an attachment of the manipulator of FIG. 1a in side view with a sheet of steel in the first position;

FIG. 2b shows the attachment of FIG. 2a in side view with a sheet of steel in the second position;

FIG. 2c shows the attachment of FIG. 2a in end view with a sheet of steel in the second position;

FIG. 3a shows the attachment of FIG. 2a in perspective view along with a portion of an embodiment of a manipulator having a sliding shuttle;

FIG. 3b shows the attachment of FIG. 2b in perspective view along with a portion of the embodiment of a manipulator depicted in FIG. 3a;

FIG. 4a shows the manipulator of FIG. 1a in side view bending the sheet of steel into the first position;

FIG. 4b is an enlarged side view of the attachment depicted in FIG. 4a;

FIG. 4c shows the manipulator of FIG. 1b in side view bending the sheet of steel into the second position; and, FIG. 4d is an enlarged side view of the attachment depicted in FIG. 4c.

DETAILED DESCRIPTION OF PREFERRED EMBODIMENTS

Figures 3A, 3B:
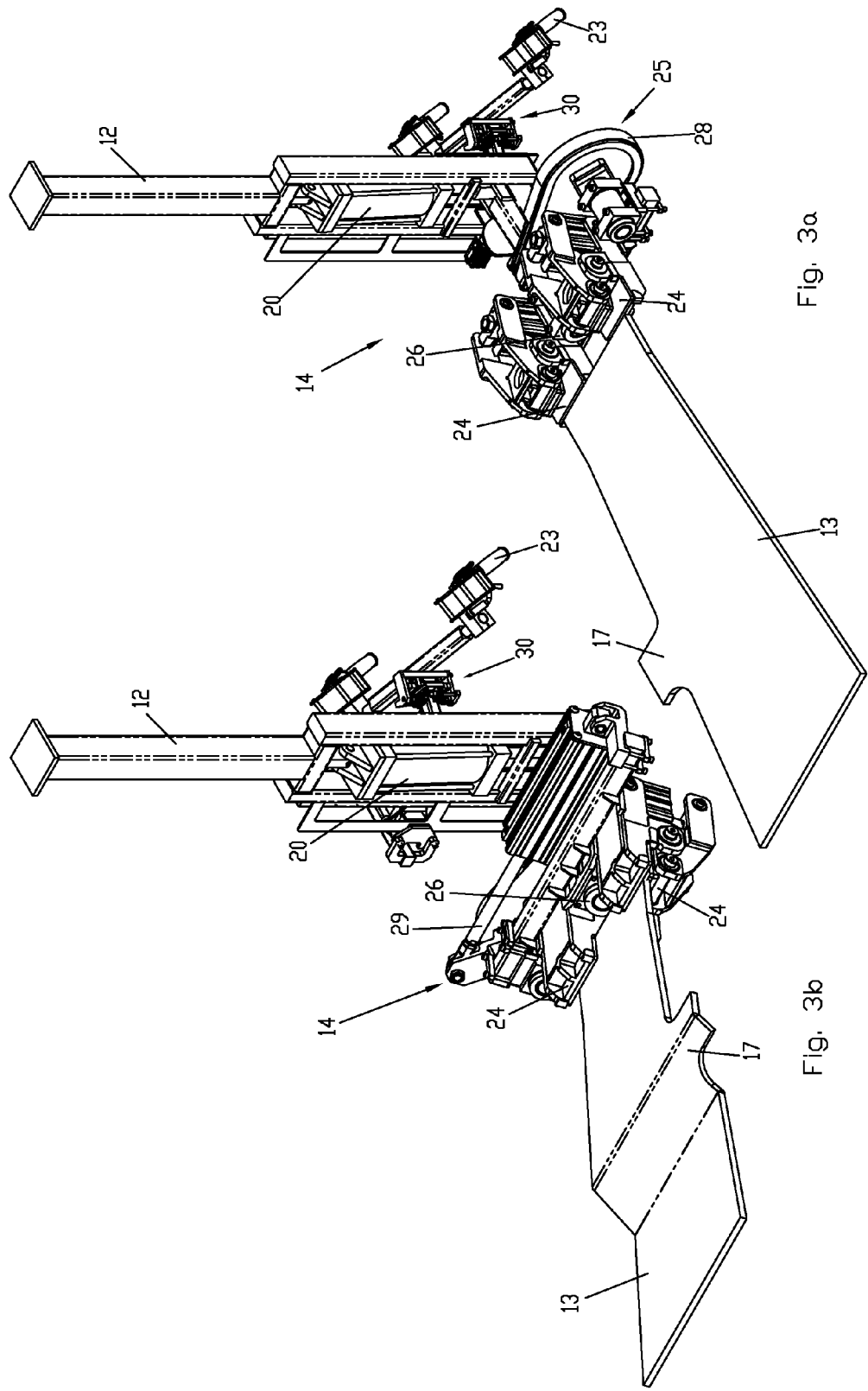

Referring to FIG. 1a, a pneumatically assisted manually operated manipulator, generally denoted as 1, comprises a vertical mast 2 with an arm 3 extending outwardly therefrom. The arm 3 is rotatably attached to the mast 2 by a first rotation means 4 that permits rotation of the arm about a first vertical axis 5 passing through the mast 2. The proximal end of the arm 3 is mounted to the first rotation means 4 by way of a pivot assembly 6 that permits the arm 3 to arcuately move as well as rotate. A second rotation means 7 is provided at the distal end of the arm 3 and is mounted in a manner that permits a second rotation axis 8 to remain vertical at all times, irrespective of the angular orientation of the arm 3. In the embodiment shown, the vertical orientation of the rotation means 7 is maintained using a parallelogram linkage 9, although other means, for example trunnion mounts or gimbals, could also be used.

One end of a horizontal extension member 10 is attached to the second rotation means 7 at the distal end of the arm 3. The opposite end of the horizontal extension member 10 includes a third rotation means 11 to which is mounted a vertical extension member 12. The length of both the horizontal and vertical extension members 10, 12 is chosen based on the intended application of the manipulator 1. Additional extension members, either horizontal or vertical, may be added depending on the range and degree of motion required for a particular application.

A pneumatic lift cylinder (not shown) connects the arm 3 to the mast 2 via a linkage located near the proximal end of the arm and is operable to resiliently bias the arm against the weight of an object being carried by the manipulator. In operation, the pneumatic lift cylinder normally has at least two operating pressures: a first (lower) pressure chosen to offset the weight of the arm and extension members so that the position of the manipulator may be manually adjusted; and, a second (higher) pressure chosen to offset the weight of the object as well as the arm and extension members. Switching from the first to the second pressures occurs when an operator attempts to manually lift the object with the manipulator and switching from the second to the first pressure occurs when the object is released. In this manner, the manipulator appears to the operator to remain neutrally buoyant, irrespective of whether or not an object is being carried.

The pneumatically assisted manually operated manipulator shown here is but one embodiment of such a device. Persons skilled in the art will realize that variations on such manipulators may also be used in the same way to achieve the same function. In fact, any lifting device that permits an object to be positioned at a selected location in three-dimensional space may be used. For example, an overhead gantry crane comprising an extendable downwardly depending mast may be used in place of the embodiment of a manipulator pictured herein to similar effect. However, it is preferable that the lifting device or manipulator permits passive or externally induced movement in at least the vertical direction, for example in response to the bending of a sheet of steel 13.

An attachment 14 is provided on the vertical extension member 12. The attachment 14, also known as an end-effector, is permitted to arcuately move in the vertical direction in response to bending of the sheet of steel 13. This externally induced bending movement also causes the vertical extension member 12 to move downwardly. The attachment 14 will be described in greater detail hereinafter.

A sheet metal brake or press 15 comprises a movable edge (not shown) that fits within a complementary die 16. The angle of the die is selected so as to create the desired bend. In FIG. 1a, it can be seen that the sheet 13 has an outwardly extending tab 17 on the left side of the sheet as viewed by the operator 18 and the bend passes through this tab. Often, a single sheet of steel 13 requires multiple bends that may need to occur in one or both sides of the sheet to achieve the desired shape. It is therefore advantageous not only to follow the externally induced movement of a sheet as it is being bent, but also to remove the sheet after a particular bend has been made and re-position and/or flip the sheet for the next required bend.

Referring to FIG. 1b, it can be seen that, in order to achieve the desired shape, it was necessary to flip the sheet, as evidenced by the location of the tab 17 on the right side of the sheet as viewed by the operator 18. After flipping, the sheet 13 was repositioned in the press 15 so that the next bend was in the desired location. This re-positioning necessitated both the partial withdrawal of the sheet from the press 15 and the creation of a different angular orientation of the attachment 14 relative to the vertical extension 12. The creation of a different angular orientation is effected by an active re-positioning of the attachment 14 that will be described in greater detail hereinafter.

Referring to FIGS. 2a, 2b and 2c, the attachment 14 is pivotally attached to the vertical extension member 12 by a pivot 19. The pivot 19 permits the attachment 14 to move arcuately in response to externally induced bending movement of the sheet 13, as can be seen by comparing FIGS. 2a and 2b. A pneumatic tilt cylinder 20 is provided on the vertical extension member 12 and pivotally attached to a rearwardly extending lever portion 21 of the attachment 14 anterior of the pivot 19. The pneumatic tilt cylinder 20 functions in a manner similar to the previously described pneumatic lift cylinder, with first and second pressures selected to offset the moment created by the weight of the attachment means by itself and the attachment means plus the object (sheet 13), respectively. Those skilled in the art will recognize that, since the required cylinder pressure depends on the moment exerted on the pivot 19 by the tilting of an object, and since the moment is a function of both the weight of the object and the length of the object relative to the attachment 14, therefore more than one second pressure set point may be required for lifting the same object from different locations on the object. The pneumatic tilt cylinder 20 may be operated using any number of pre-determined pressure set points in order to allow the lifting of a variety of objects and/or to allow lifting from a variety of positions on the same object. Alternatively, the second pressure set point may be operator adjustable in order to provide maximum flexibility in lifting location.

During the passive mode of operation, the pneumatic tilt cylinder 20 plus the lever portion 21 function as a resilient biasing means that permits arcuate movement of the attachment means in response to externally induced bending movement of the sheet 13. After the bending operation is completed and the sheet 13 is removed from the press 14 using the manipulator, the angular position of the sheet may have to be actively adjusted in order that the sheet enters the press at an appropriate angle. This is accomplished by injecting air into or exhausting air from the pneumatic tilt cylinder 20 in order that the second pressure is slightly elevated or slightly reduced, respectively, relative to its setpoint. This has the effect of upwardly or downwardly arcuately moving the attachment means about pivot 19. However, since a regulator is employed to constantly maintain the second pressure, this active tilting operation is continuously resisted by the regulator as it tries to maintain the second pressure setpoint. The active tilting operation is activated using switches on the operator control center 22 and, when the switches are released, the regulator returns the pressure in the tilt cylinder 20 to the second pressure set point and the arcuate movement of the attachment 14 stops. Since only a slight increase or decrease in the cylinder pressure occurs, the active mode of operation is quite safe and any inadvertent impact between the object 13 and an obstacle immediately halts the arcuate movement without risk of injury or property damage.

In the active mode, the pneumatic tilt cylinder 20 and the lever 21 together function as an adjustment means for selectively provided the force required to change the angular orientation of the sheet 13. Although the biasing means and the adjustment means share common components of the attachment 14, they utilize those components at different times during different modes of operation and therefore tend to function in a mutually exclusive manner.

The attachment 14 is also provided with securement means 24 for securing the sheet 13 to the attachment. In the embodiment shown, the securement means 24 comprises a pair of pneumatically actuated clamps; however, it will be evident to persons skilled in the art that the securement means may comprise any suitable selectively actuated gripping element, for example a pincer, an electro-magnet, a vacuum powered suction cup, or the like. The securement means 24 is selectively actuated using the operator controls 22. The gripping force is normally pre-determined based upon the characteristics of the object being lifted, but also may be user adjustable to suit the gripping of different objects.

Since it is often necessary to flip the sheet 13 to achieve the desired shape, the attachment 14 preferably further includes a rotation means 25. The rotation means 25 is mounted on a shaft 26 extending from the pivot 19 and through which a rotation axis passes. The securement means 24 is mounted on the rotation means 25 and the sheet 13 therefore also rotates about the rotation axis in response to operation of the rotation means. The rotation axis preferably lies on a plane formed between the securement means 14 and the pivot 19. In this manner, the object (sheet 13) rotates about an axis passing through at least the portion of the object that is secured by the securement means 24. A first sprocket (not shown) is fixed to the shaft 26 and a second sprocket 28 is located outwardly of the first sprocket and rotatably attached to the rotation means 25. The second sprocket 28 includes a radially extending dog 27 to which a pneumatic rotation cylinder 29 is attached so that extension or retraction of the cylinder causes rotational movement of the second sprocket 28. The second sprocket 28 is linked to the first sprocket by an endless chain drive and, upon rotation, moves orbitally about the shaft 26. This in turn causes the rotation means 25 to turn about the rotation axis. The relative size of the first and second sprockets and the stroke length of the pneumatic rotation cylinder 29 are selected so as to allow the rotation means 25 to turn a full 180°. This allows the sheet 13 to be flipped as needed for bending from either side. Since the shaft 26 is aligned with the pivot 19, the rotation axis moves arcuately with the attachment 14 and rotation of the sheet 13 can be accomplished at any angular orientation. Persons skilled in the art will realize that this is but one embodiment of a rotation means that might be used in accordance with the present invention and that other variants might be used or the rotation means 25 might be omitted entirely.

Referring to FIGS. 3a and 3b, the various parts of the attachment and manipulator apparatus that were previously described are shown in perspective view, with like parts being indicated by like reference numerals. This embodiment of the manipulator includes a sliding shuttle 30 to which the handles 23 are mounted. The sliding shuttle 30 is resiliently biased toward a neutral medial position and permits temporary upward and downward movement therefrom in response to operator movement of the handles 23. At the upper and lower limits of travel of the shuttle 30, a switch is engaged that actuates a slight increase or decrease in pressure, respectively, of the pneumatic lift cylinder. The pressure increase has the effect of gently boosting the manual raising of the object (sheet 13) to assist the operator in overcoming the inertia, friction and air flow restrictions of the manipulator system. A similar effect is observed upon pressure decrease when lowering the object. The need for boosting the otherwise neutrally buoyant object is exacerbated when particularly heavy objects are manipulated, as the components of the manipulator system increase in size to the point that inertia, friction and air flow restrictions become more significant relative to the strength of the operator.

Referring to FIGS. 4a and 4b, a method of bending a sheet using the attachment 14 comprises first positioning the attachment adjacent the object (sheet 13) using the handles 23 and actuating the securement means 24 using the operator controls 22. Once the sheet 13 is secured, the operator 18 lifts upwardly on the handles 23, which in turn slides the shuttle 30 to its upper position and activates a pressure boost in the pneumatic lift cylinder to aid the operator 18 in manually lifting the sheet 13. Once the sheet 13 is raised to its desired position, the operator stops lifting and the shuttle 30 naturally returns to its medial position, returning the lift cylinder to the second pressure. The sheet 13 is then neutrally buoyant and can be positioned within the press 15. Upon activating the press 15 and bending the sheet, movement of the sheet is externally induced by the press and the attachment 14 passively moves arcuately about the pivot 19 in response to sheet bending. The vertical extension member 12 also moves vertically, causing an arcuate movement of the arm 3 relative to the mast 2.

Referring to FIGS. 4c and 4d, the sheet 13 is then removed from the press and the angular orientation of the sheet is actively adjusted by the operator 18 using the controls 22 to temporarily alter the pressure in the pneumatic tilt cylinder 20 in order to upwardly or downwardly tilt the sheet until the desired angular orientation is reached. The sheet 13 may be optionally rotated about the rotation axis in order to bend the sheet from the opposite side, if required. The rotation of the sheet 13 may be accomplished before, during or after active angular adjustment of the sheet. The sheet may then be re-inserted within the press 15 to make the next successive bend and this series of operations may be repeated as many times as necessary.

Although the attachment 14 is depicted throughout the figures secured to an end of the sheet 13 for direct insertion into the press 15, the attachment 14 could readily be secured to a side of the sheet 13. In this case, the externally induced bending movement of the sheet 13 causes a passive rotation of the rotation means 25 in conjunction with vertical adjustment of the vertical extension member 12. Similar considerations apply upon removal of the sheet 13 from the press, in that the rotation means 25 and/or the angular orientation may be actively adjusted to attain the desired orientation for the next successive bend.

The foregoing describes preferred embodiments of the invention and other features and embodiments of the invention will be evident to persons skilled in the art. The following claims are to be construed broadly with reference to the foregoing and are intended by the inventor to include other variations and sub-combinations of the invention, even if not explicitly claimed.

The invention claimed is:

1. An attachment for a lifting device capable of positioning an object in three-dimensional space, the attachment comprising:
   selectively engageable securement structure configured to selectively secure the object to the attachment and selectively release the object from the attachment;
   pivot structure for permitting arcuate movement of the attachment relative to the lifting device; and,
   a tilt cylinder configured to mutually exclusively function as both:
   i) a resilient biasing structure configured to provide a biasing force sufficient to offset the weight of the object, the biasing structure permitting externally induced movement of the attachment means about the pivot structure and,
   ii) an adjustment structure configured to selectively provide an adjustment force for changing an angular orientation of the attachment relative to the pivot structure.

2. The attachment of claim 1, wherein the tilt cylinder is pneumatic and is configurable to have selectable first and second pressures, the first pressure chosen to provide the biasing force, the second pressure chosen to provide the adjustment force.

3. The attachment of claim 2, wherein the pressure in the pneumatic tilt cylinder can be temporarily increased and/or reduced relative to at least the second pressure in order to actively arcuately move the attachment about the pivot.

4. The attachment of claim 1, wherein the attachment further comprises a rotation structure configured to for rotate the object about a rotation axis passing through the pivot structure that is arcuately adjustable with the attachment.

5. The attachment of claim 4, wherein the rotation axis lies in a plane passing through the securement structure and the pivot structure.

6. The attachment of claim 4, wherein the rotation structure permits externally induced rotation of the attachment about the rotation axis.

7. The attachment of claim 4, wherein the rotation structure comprises a pneumatically driven orbital sprocket or gear.

8. The attachment of claim 7, wherein the orbital sprocket or gear is rotatably attached to the rotation structure and wherein the orbital sprocket or gear comprises a radial dog operatively attached to a pneumatic rotation cylinder that is operable to extend or retract and thereby cause rotational movement of the rotation structure about the rotation axis.

9. The attachment of claim 1, wherein the securement structure comprises one or more clamps, one or more magnets, one or more suction cups, or a combination thereof.

10. A pneumatically assisted manually operated manipulator comprising:
    a rotatable vertical extension member manually positionable in three-dimensional space;
    an end-effector attached to the vertical extension member comprising,
        a selectively engageable securement structure for selectively securing the object to the attachment and selectively releasing the object from the attachment,
        a pivot structure for permitting arcuate movement of the attachment relative to the lifting device,
        a tilt cylinder configured to mutually exclusively function as both:
        a resilient biasing structure configured to provide a biasing force sufficient to offset the weight of the object, the biasing structure permitting externally induced movement of the attachment about the pivot structure, and, an adjustment structure configured to selectively provide an adjustment force for changing an angular orientation of the attachment relative to the pivot structure;
    an operator control center on the vertical extension member operatively interconnected with the end effector; and,
    at least a handle for use by an operator in manually positioning the end-effector.

11. The manipulator of claim 10, wherein the manipulator further comprises a pneumatic lift cylinder having a cylinder pressure selected to offset the weight of an object being lifted by the manipulator.

12. The manipulator of claim 10, wherein the operator control center is located on the handle.

13. The manipulator of claim 11, further comprising:
   e) a vertical mast;
   f) an arm extending outwardly from the mast, the arm pivotally attached at a proximal end to a first rotation structure mounted on the mast and rotatable about a first vertical rotation axis passing through the mast, the pivotal attachment permitting arcuate vertical movement of the arm relative to the mast, the arm having a distal end opposite the proximal end;
   g) a horizontal extension member attached to the distal end by way of a second rotation means having a second vertical rotation axis passing therethrough that remains vertical irrespective of the angular orientation of the arm;
   h) the vertical extension member attached to the horizontal extension member opposite the arm by way of a third rotation means having a third vertical rotation axis passing therethrough;
   i) the pneumatic lift cylinder connected between the mast and the arm for supporting the arm.

14. The manipulator of claim 13, wherein the second vertical rotation axis maintains its vertical orientation by means of a parallelogram linkage.

15. A pneumatically assisted manually operated manipulator comprising:
   a rotatable vertical extension member manually positionable in three-dimensional space;
   an end-effector attached to the vertical extension member comprising,
   a selectively engageable securement structure for selectively securing the object to the attachment and selectively releasing the object from the attachment,
   a pivot structure for permitting arcuate movement of the attachment relative to the lifting device,
   a pneumatic tilt cylinder configured to mutually exclusively function as both:
   a resilient biasing structure configured to provide a biasing force sufficient to offset the weight of the object through use of a first cylinder pressure, the biasing structure permitting externally induced movement of the attachment about the pivot structure, and,
   an adjustment structure configured to selectively provide an adjustment force for changing an angular orientation of the attachment relative to the pivot structure;
   an operator control center on the vertical extension member operatively interconnected with the end effector; and,
   at least a handle for use by an operator in manually positioning the end-effector connected to the vertical extension member by a sliding shuttle having a neutral position, an upper position and a lower position.

16. The manipulator of claim 15, wherein movement of the handle upwardly causes the shuttle to move to the upper position and actuates a switch that increases the cylinder pressure to assist the operator in lifting the object.

17. The manipulator of claim 15, wherein movement of the handle downwardly causes the shuttle to move to the lower position and actuates a switch that decreases the cylinder pressure to assist the operator in lowering the object.

* * * * *